C. P. MADSEN.
COMBINATION SAD IRON AND COOKER.
APPLICATION FILED FEB. 25, 1910.
1,018,576.
Patented Feb. 27, 1912.
2 SHEETS—SHEET 2.
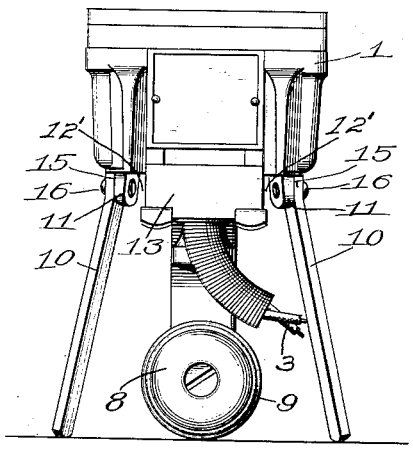
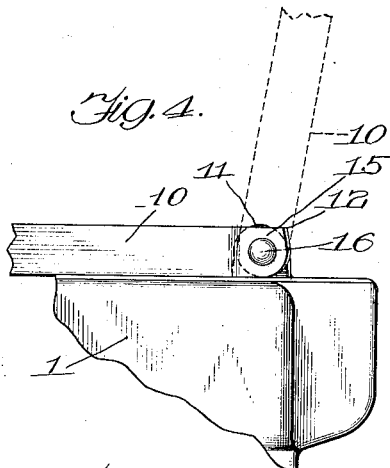
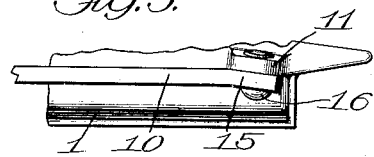
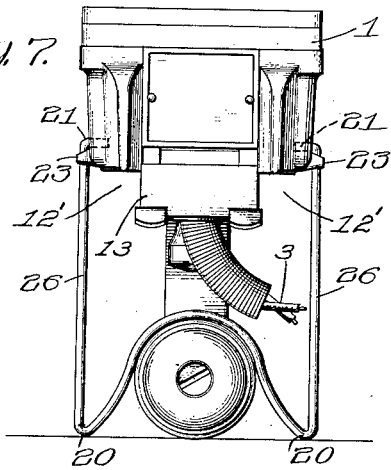
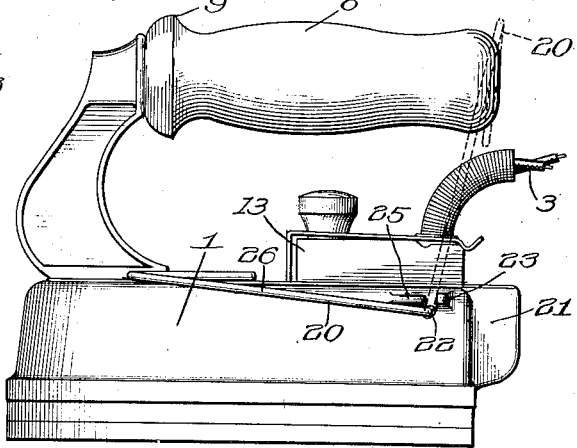
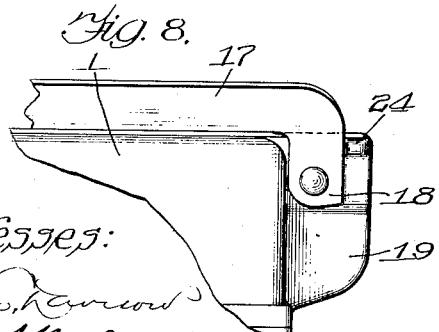
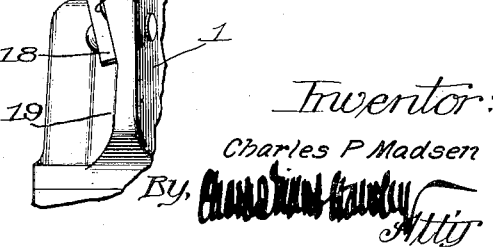
Inventor:
Charles P. Madsen

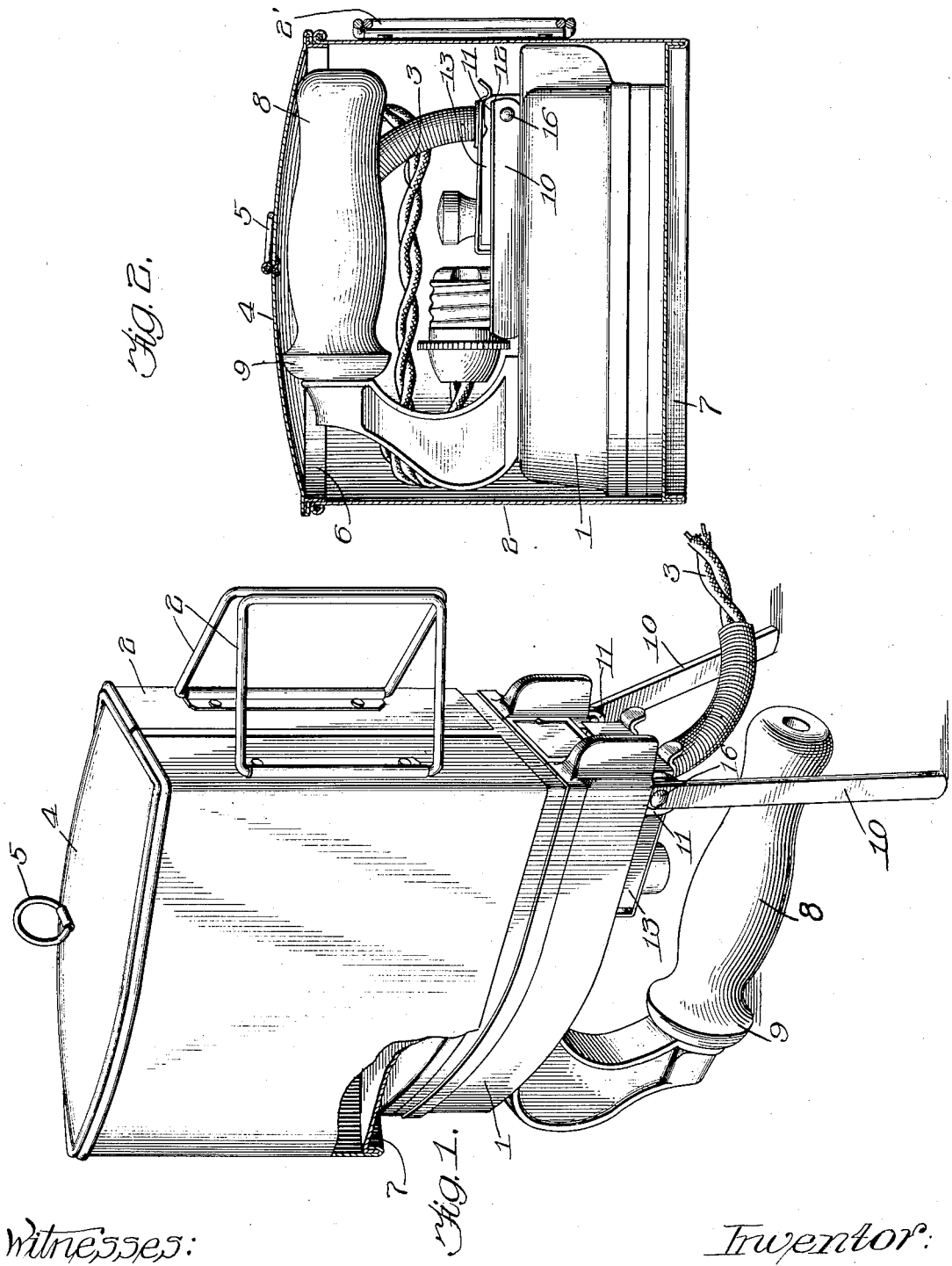

UNITED STATES PATENT OFFICE.

CHARLES P. MADSEN, OF CHICAGO, ILLINOIS, ASSIGNOR TO PELOUZE ELECTRIC HEATER CO., OF CHICAGO, ILLINOIS, A CORPORATION OF ILLINOIS.

COMBINATION SAD-IRON AND COOKER.

1,018,576.  Specification of Letters Patent.  Patented Feb. 27, 1912.

Application filed February 25, 1910. Serial No. 545,990.

*To all whom it may concern:*

Be it known that I, CHARLES P. MADSEN, a citizen of the United States, residing at 232 East Ohio street, in the city of Chicago, county of Cook, and State of Illinois, have invented certain new and useful Improvements in Combination Sad-Irons and Cookers, of which the following is a full, true, clear, and exact description, such as will enable others skilled in the art to which it appertains to make and use the same.

My invention relates to a new portable article for travelers' use, adapted for use both as a sad-iron and cooker.

The object of my invention is to provide a portable, combined sad-iron and cooker, the cooking vessel being adapted to snugly contain the iron for transportation.

A further and special object of my invention is to provide a sad-iron with foldable supports which shall not interfere with the ordinary uses of the iron, and which may be quickly and easily adjusted to support the iron in inverted position so that it may be used as an electric stove.

A still further object of the invention is to provide a novel cooking vessel which shall be similar to the sad-iron in shape, which shall serve as a container for the whole sad-iron when not in use, and which, when in use, shall so interlock with the bottom of the iron as to prevent the lateral displacement of the vessel on the inverted iron.

My invention consists in a combined sad-iron and cooker comprising a vessel of sad-iron shape, and a sad-iron having foldable supports normally closed upon the iron but adapted to support the iron when the latter is inverted.

My invention further and particularly consists in an electric sad-iron having a suitable handle, in combination with hinged supporting means formed to normally lie against, or close to, the body of the iron and adapted, when opened out, to co-act with the handle of the iron in supporting the iron in inverted position.

A distinct feature of my invention resides in the formation and construction of the foldable supports in such manner that, when not in use, they lie close to the body of the iron and when in use they spread apart, the points of support being thus widely separated to insure stability of the iron.

A further and distinct feature of my invention resides in a cooking vessel which, in shape, substantially conforms to the shape of the bottom of the iron and is provided with interlocking means adapted to engage the edges of the iron bottom and prevent the lateral displacement of the vessel on the inverted iron. And broadly, my invention consists in an electric sad-iron combined with a containing vessel of substantially the shape of the bottom of the iron and adapted to contain the whole iron, the external bottom of said vessel and the bottom of the iron being formed to interlock, as before suggested.

In the accompanying drawings, which form part of this specification, I have illustrated the preferred embodiment of my invention and have also shown several modifications of the supporting means.

Figure 1 is a perspective view of a combination sad-iron and cooker, made in accordance with my invention, a portion of the cooking vessel being broken away for illustrative purposes; Fig. 2 is a vertical longitudinal section of the cooking vessel used as a container, for the iron, showing the sad-iron with its attachments inclosed therein, in condition to be conveniently transported; Fig. 3 is a rear elevation of the sad-iron in its inverted position; Figs. 4 and 5 are enlarged fragmentary views of a portion of the body of the iron showing the shape and the method of attaching the supports; Figs. 6 and 7 are side and rear elevations, respectively, of the iron, illustrating a modified form of support; Figs. 8 and 9 are enlarged fragmentary views showing a second modification of the supporting means.

My combined sad-iron and cooker, comprises an electric sad-iron, 1, of well-known form, provided with adjustable supporting means, and a containing vessel, 2. Said vessel is adapted at times to be used as a container for the iron and its attachments, and at other times to be used as a cooking vessel to be placed upon the inverted iron.

The containing vessel, 2, is substantially the shape of the bottom of the iron and is only sufficiently large to contain the whole of the iron and its attachments. As shown in Fig. 2 the sad-iron and its attaching cord, 3, can be compactly stored within the vessel, 2. The vessel, 2, is provided with a cover, 4, of usual construction adapted, when the iron is within the vessel to completely cover same in a substantial manner. When the container is used as a cooking vessel the cover, 4, performs the office of a lid for same and is provided with the folding lifting ring, 5. The cover is also provided with a flange, 6, adapted to enter the mouth of the container to hold the cover in position.

The vessel, 2, is provided with folding handles, 2′, conveniently located upon its broad or heavy end by which the vessel may be easily lifted. The handles, 2′, are arranged to be folded flat against the broad end of the vessel and the lifting ring, 5, is adapted to be folded close to the cover, as shown in Fig. 2 to bring the package as a whole within as small a compass as possible for convenience in packing the device in a grip or trunk.

To prevent the vessel from being accidentally displaced from the iron when in use as a cooking vessel, it is provided with a depending circumferential flange or rim, 7, on its lower end, adapted to engage the bottom of the iron when in position upon same. This formation of the containing vessel with the engaging flange leaves the vessel free to be lifted from the iron when desired. It also provides a raised support for the vessel, when removed from the iron, thus preventing the heated vessel from damaging whatever it may be placed upon.

When the device is used as a cooker, the iron is inverted, as shown in Fig. 1, and the vessel, 2, is placed upon its upturned heating surface. The iron is provided with a rigidly mounted handle, 8, of suitable heat insulating material. The handle, 8, is carried by a stem, 8′, which rises from the point of the iron, the handle being substantially parallel with the iron. The handle is provided with an enlargement, 9, adjacent its connection to the stem, 8′, which acts as one point of support below the forward end or point of the iron when it is inverted. It is obvious that the supporting point furnished by the handle might rise from the stem, 8′, or from the body of the iron itself without in any way affecting the invention.

As at least three points of support are necessary to hold the iron solidly in inverted position, I preferably provide them by supplying the iron with two hinged legs, 10. The legs, 10, are hinged to the iron adjacent the rear or broad end of same on lugs, 11, by means of horizontal rivets or pivot pins, 16. The legs, 10, normally lie folded close to the body of the iron, as shown in Fig. 2, where they do not interfere with the ordinary use of the iron. When it is desired to use the iron as a stove the legs are swung on their pivots to a position substantially vertical to the iron or slightly beyond the vertical position, as shown in Fig. 1. In this position the legs act as supports, in addition to the support provided by the handle, to hold the iron solidly in an inverted position.

It is desirable that the points of support furnished by the legs, 10, be spread apart to a distance equal to or greater than the extreme width of the iron, so that they will be well outside the center of gravity of the cooker. The cooker will thus be supported in a very stable condition. To give this spread to the free ends of the legs, 10, when in their operative position, and still have them lie within the limits of the width of the iron when in their folded or closed position, the lugs, 11, upon which the legs are mounted are set at a slight angle to the center line of the iron. The faces, 15, of the lugs, 11, on which the legs, 10, are pivotally mounted, stand vertically to the upper surface of the iron and at a rearwardly spreading angle. As the legs are swung from their folded position, to their extended position, the free ends swing outwardly from the center of the iron due to the angular position of said lugs, 11. The legs, 10, in their folded or closed position occupy narrow, longitudinal spaces, 12′, at either side of an electric switch or contact device, 13, which lies centrally beneath the handle, 8. The spaces, 12′, being quite narrow, the legs, 10, are bent outwardly adjacent their hinged ends to cause them to lie parallel with the sides of said electric contact device and within said narrow spaces, 12′. The bending of the legs, 10, causes their free ends to be spread a slight additional amount to the spread caused by the angularity of the lugs, 11. To prevent the legs, 10, from swinging beyond their desired operative position, projections, 12, are provided on their rear ends. Said projections, 12, are adapted to come into contact with the surface of the iron, when the legs reach their extended position, as shown in dotted lines in Fig. 4.

In Figs. 8 and 9 I have shown a slight modification of the legs and their mounting. Instead of hinging the legs on the upper surface of the iron, as shown in Figs. 1 to 4, they may be hinged on the rear end of the iron, as shown in Figs. 8 and 9. In this modified form the legs are L shaped. The long arms, 17, of same, when in their folded position, extending along the surface of the iron, and the short arms, 18, projecting downward close to the rear end of the iron. The legs are pivoted on the outer faces of rearwardly projecting lugs, 19. In this instance the faces against which the lugs are held are positioned at an upward spreading angle and have the same effect as the angularity of the lugs, 11, in causing the free ends of the legs to move outwardly from the iron as they are swung from their folded or closed position to their extended or open position.

Instead of using separate legs, as has been described, a support may be formed of a single piece of metal, as shown in Figs. 6 and 7. In this instance, a support, 20, is illustrated, formed of a single piece of wire bent into a substantially U-shape and having its free ends, 21, turned inwardly. Holes or sockets, 22, are provided in the sides of the body of the iron, adjacent the rear upper corners of same, to receive the inwardly turned ends, 21, of the support, 20. Small projections or stops, 23, on the surface of the body of the iron, above and to the rear of the sockets, 22, to prevent the support from being swung past its proper extended or open position.

It is desirable to hold the legs in their extended position in such a manner that they can not be accidentally returned to their closed position. To accomplish this, small rounded projections, 24, as shown in Figs. 8 and 9, are provided on the surface of said lugs, 19, over which the legs are sprung as they are being extended. The projections, 24, prevent the accidental return of the legs to their closed positions. In Figs. 6 and 7 small rounded projections, 25, are provided over which the side bars, 26, of said support, 20, spring as said support is moved to its operative position. As the legs are swung past a vertical position in relation to the iron, to reach their extended position, the weight of the iron and the cooker, as a whole when in operative position helps to hold said legs in their extended position, as the weight of the cooker would necessarily be raised in swinging the legs back from their operative position.

Having thus described my invention, I claim as new and desire to secure by Letters Patent:

1. The combination with a sad-iron and foldable legs attached to and carried by said iron for supporting said iron in inverted position, of a containing vessel therefor conformed to the shape of the iron and means carried by said vessel for maintaining it in position on said iron when the iron is in its inverted position, substantially as described.

2. The combination with a vessel, of a sad-iron having a handle and legs independent thereof together supporting said sad-iron in inverted position, said vessel conformed to the shape of the iron and adapted to contain same, the side wall of said vessel extending below and surrounding the bottom wall of said vessel adapted to interlock with the bottom of the iron when the iron is in inverted position, substantially as described.

3. The combination with a sad-iron having a handle and foldable legs forming supports for said iron in inverted position, a vessel conformed to the shape of the iron and adapted to contain same when the iron is not in use and a flange rim surrounding the edge of the bottom wall of said vessel for preventing lateral movement of said vessel on said iron when the iron is in inverted position, substantially as described.

4. In a combined sad-iron and cooker, the combination of an electric sad-iron with a cooking vessel of substantially the same shape, and formed to operatively interlock therewith, said sad-iron being provided with foldable supporting means attached to and carried by the iron and normally closed thereon, but adapted to be extended to support the iron in inverted position, substantially as described.

5. In a combined sad-iron and cooker the combination of an electric sad-iron with a cooking vessel of substantially the same shape, and provided with a flange on one end adapted to interlock with the bottom of the iron, said sad-iron being provided with foldable supporting means carried by the iron and normally closed thereon, but adapted to be extended to support the iron in inverted position.

6. In a combined sad-iron and cooker, the combination of an electric sad-iron with a cooking vessel of substantially the same shape, and provided on its base with a flange to interlock with the bottom of the iron to prevent lateral displacement of the vessel, said sad-iron being provided with foldable supporting means carried by the iron and normally closed thereon, but adapted to be extended to support the iron in inverted position, said means comprising legs pivotally secured at one end to the body of the iron and movable from an inoperative to an operative position, substantially as described.

7. A combined sad-iron and cooker comprising a sad-iron containing vessel substantially the shape of the iron and a sad-iron, the vessel being formed to operatively interlock with the sad-iron, supports hinged to the body of the iron adjacent its rear end, said supports being normally closed upon the iron but adapted to be extended to support the iron in inverted position, and means whereby the free ends of said supports are positioned farther apart in their operative than in their inoperative position, substantially as described.

8. A combination iron and cooking device comprising an electric sad-iron having a handle, and members carried by and attached to the iron, said members being movable to substantially vertical position wherein they co-act with the handle to support the iron in inverted position, substantially as described.

9. A combination ironing and cooking device comprising an electric sad-iron having a fixed handle forming one point of support under the point of the iron, and having legs hinged to the iron adjacent its broad end and movable from a normally inoperative position, wherein they lie close to the iron, to an operative position, substantially at right angles to their normally closed position, said legs and handle coöperating to support the iron in an inverted position, substantially as described.

10. A combination ironing and cooking device comprising an electric sad-iron having a rigid handle, and having legs carried by and hinged on the iron, said legs being normally closed upon the iron but movable to a position substantially at right angles to their closed position to co-act with the handle to support the iron in inverted position, substantially as described.

11. A combination ironing and cooking device comprising an electric sad-iron having a rigid handle, in combination with legs carried by and pivoted on the iron, and movable from a normally closed position to a position substantially at right angles thereto wherein they co-act with the handle to support the iron in inverted position, said hinges acting to spread the free ends of said legs laterally as the legs are moved to their right-angled position, substantially as described.

12. A combination ironing and cooking device comprising an electric sad-iron having a rigid handle, in combination with hinged legs carried by the iron, normally collapsed thereupon but movable to a position substantially at right angles to their collapsed position and adapted to co-act with the handle to support the iron in inverted position, said legs being mounted on diagonally positioned lugs whereby their free ends are positioned farther apart in their open than in their closed position, substantially as described.

13. A combination ironing and cooking device comprising a sad iron and means for supporting said iron in inverted position, a vessel having its side wall conformed to the contour of said iron, a wall in said vessel intermediate the bottom and top thereof dividing said vessel into two compartments, one of said compartments being adapted to receive and contain said iron when the device is not in use and said other compartment being adapted to fit and interlock with the bottom of the iron when the device is used for cooking.

14. A combination ironing and cooking device comprising an electric sad iron, and means for supporting said iron in an inverted position, a vessel having one of its walls conformed generally to the contour of the iron and having another wall intermediate the top and bottom of said vessel, dividing the vessel into a deep and a shallow compartment, said deep compartment serving as a container for the complete iron when the device is not in use and said shallow compartment being adapted to serve as a socket interlocked with the lower or base portion of the iron when the device is used for cooking.

15. A combination ironing and cooking device comprising an electrically heated sad iron and supporting means by which said iron may be held in an inverted position, a vessel for receiving and containing the complete iron when the device is not in use, and having an inset, flat bottom wall which, together with the lower edge of its side wall, forms a shallow socket co-acting with the bottom portion of the iron to prevent relative displacement when the iron is in its inverted cooking position.

16. A combination ironing and cooking device comprising an electrically heated sad iron and supporting means by which said iron may be held in an inverted position, a vessel for receiving and containing the complete iron when the device is not in use, and having an inset, flat bottom wall which, together with the lower edge of its side wall, forms a shallow socket co-acting with the bottom portion of the iron to prevent relative displacement when the iron is in its inverted cooking position, and a separable cover for said vessel.

17. A combination ironing and cooking device comprising an electric invertible sad iron having members attached to and normally collapsed thereon but extensible for supporting the iron in its inverted position when the device is used for cooking, and a vessel shaped to the general contour of the iron and having a compartment for containing the iron when not in use, and a flanged bottom for said vessel adapted for interlockment with the bottom of the iron to prevent relative lateral displacement of the vessel and iron when the device is used for cooking.

18. A self-contained, portable electric combination ironing and cooking device for travelers' use, consisting of an electric sad iron adapted to be used in an inverted position for cooking, hinged standards on said iron movable to a position where they coact with the handle of the iron to support the iron in its inverted position, and a containing and carrying vessel for receiving the entire sad iron when the device is not in use, said vessel having an indented socket forming bottom adapted for interlockment with the bottom of the iron when the device is used for cooking purposes.

In testimony whereof, I have hereunto set my hand, this 22d day of February, 1910, in the presence of two subscribing witnesses.

CHARLES P. MADSEN.

Witnesses:
 CHARLES GILBERT HAWLEY,
 JOHN R. LEFEVRE.